Figure 1:
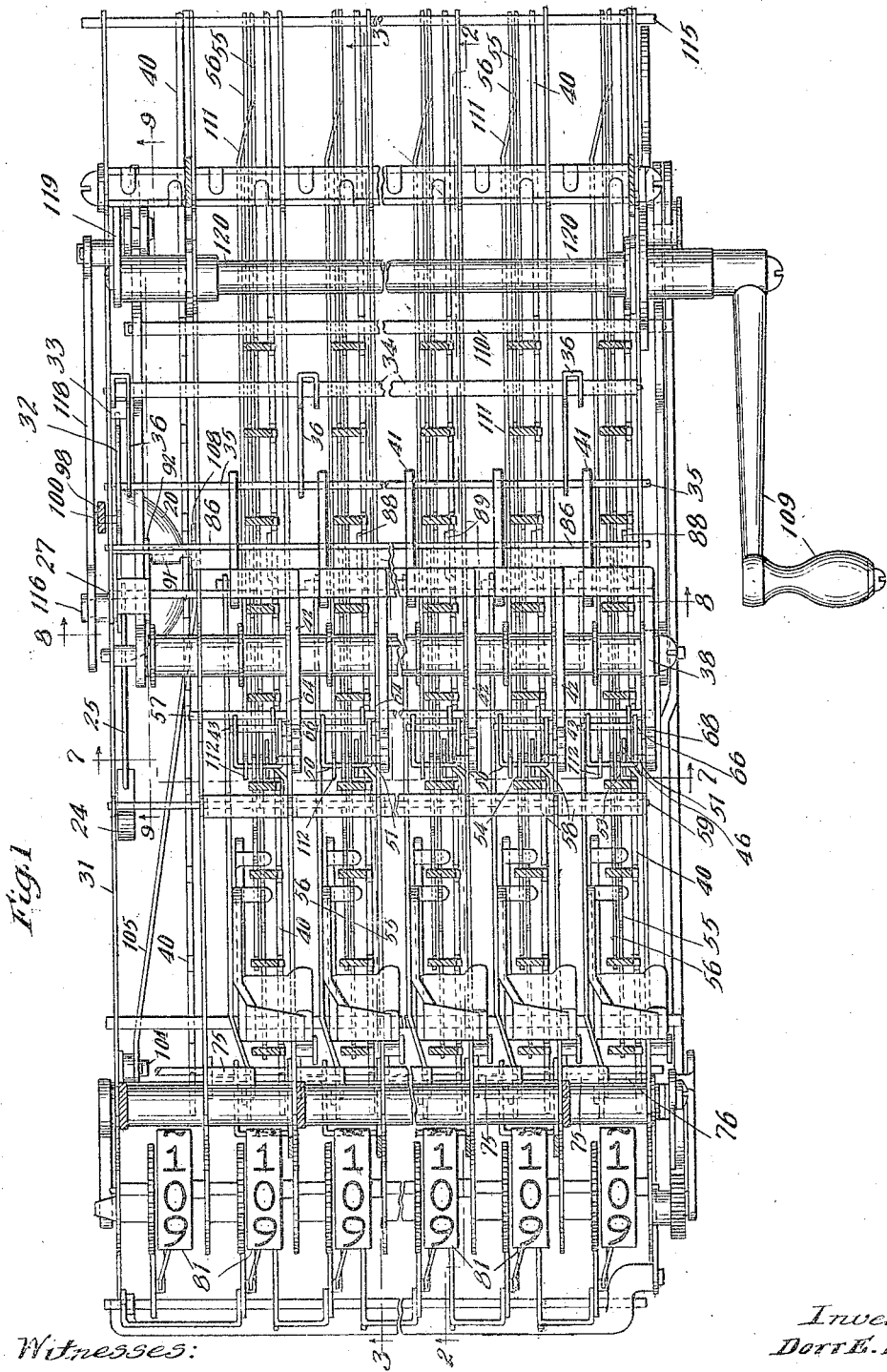

D. E. FELT.
CALCULATING MACHINE.
APPLICATION FILED DEC. 18, 1909.

992,950.

Patented May 23, 1911.
10 SHEETS—SHEET 1.

Witnesses:
Wm. Geiger
Pearl Abrams

Inventor:
Dorr E. Felt
By Munday, Evarts, Adcock & Clarke.
Attorneys

D. E. FELT.
CALCULATING MACHINE.
APPLICATION FILED DEC. 18, 1909.

992,950.

Patented May 23, 1911.
10 SHEETS—SHEET 5.

Witnesses:
Wm. Geiger
Pearl Abrams

Inventor
Dorr E. Felt
By Munday, Evarts, Adcock & Clarke
Attorneys

D. E. FELT.
CALCULATING MACHINE.
APPLICATION FILED DEC. 18, 1909.
992,950.
Patented May 23, 1911.
10 SHEETS—SHEET 6.
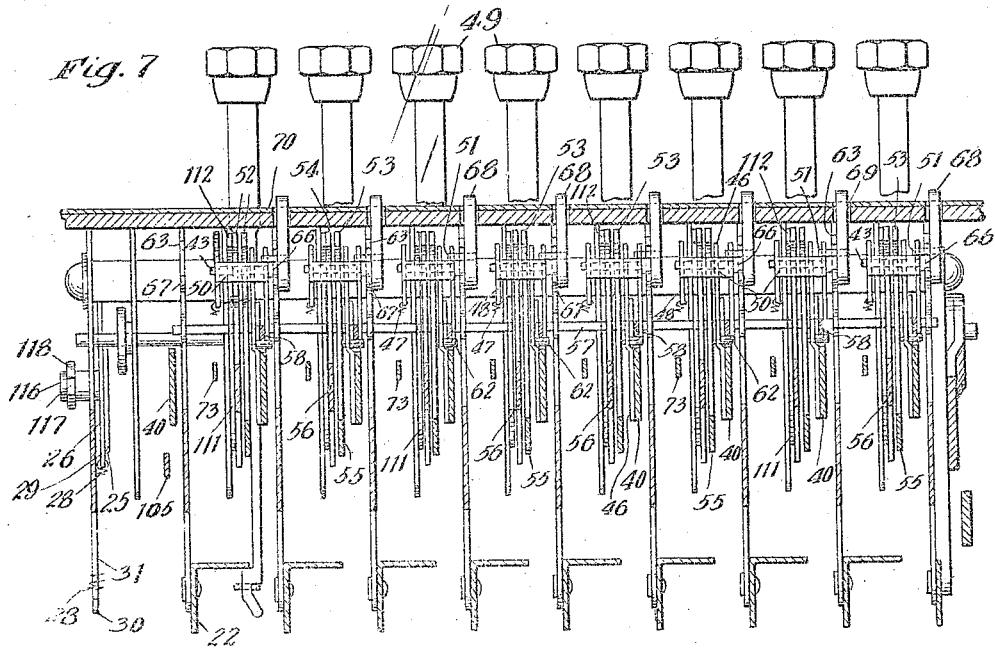
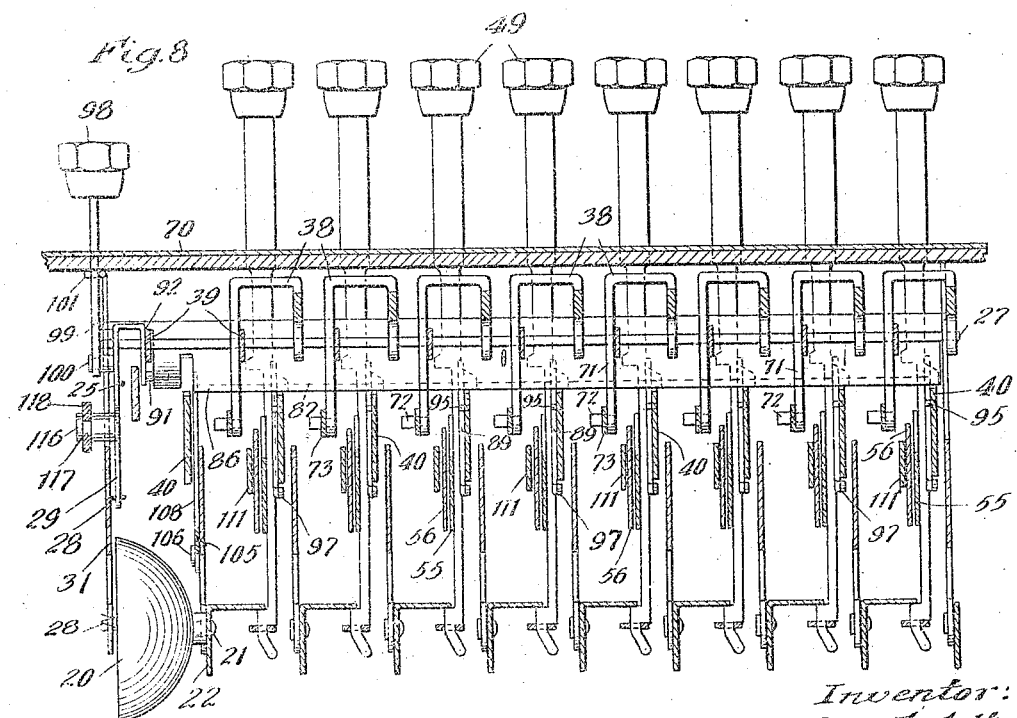

D. E. FELT.
CALCULATING MACHINE.
APPLICATION FILED DEC. 18, 1909.

992,950.

Patented May 23, 1911.
10 SHEETS—SHEET 7.

Witnesses:
Wm. Geiger
Pearl Adams

Inventor:
Dorr E. Felt
By Munday, Evarts, Adcock & Clarke
Attorneys

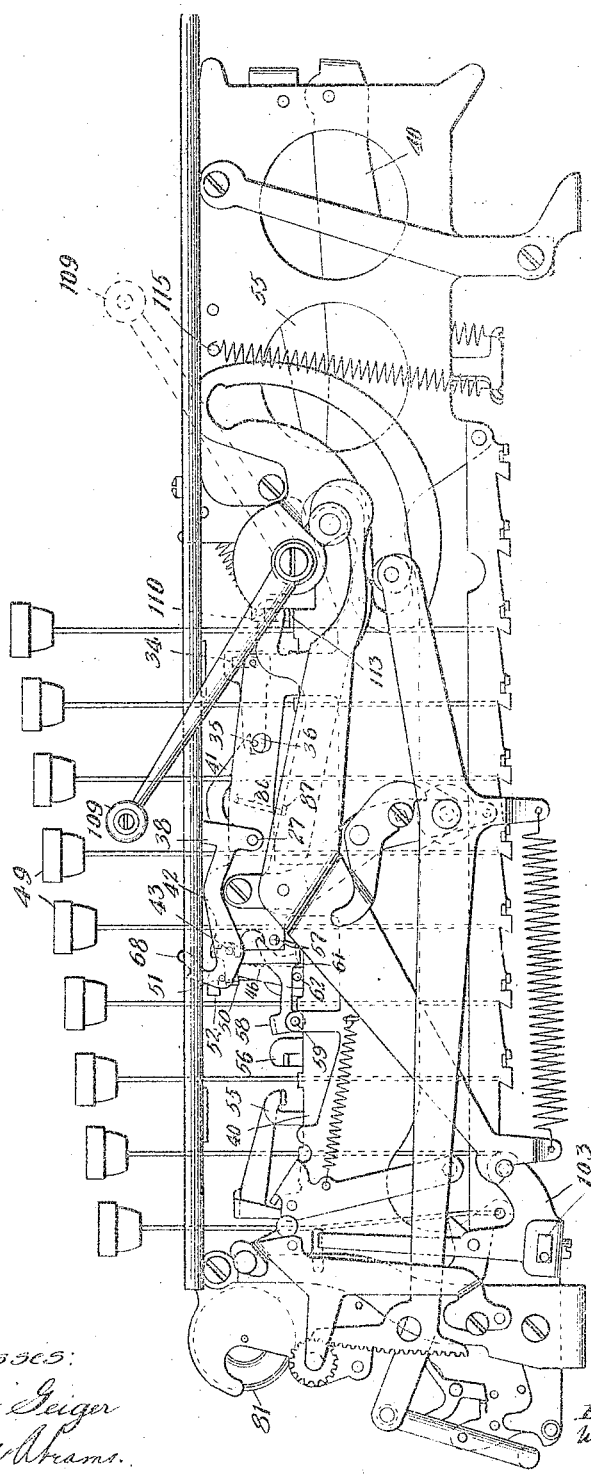

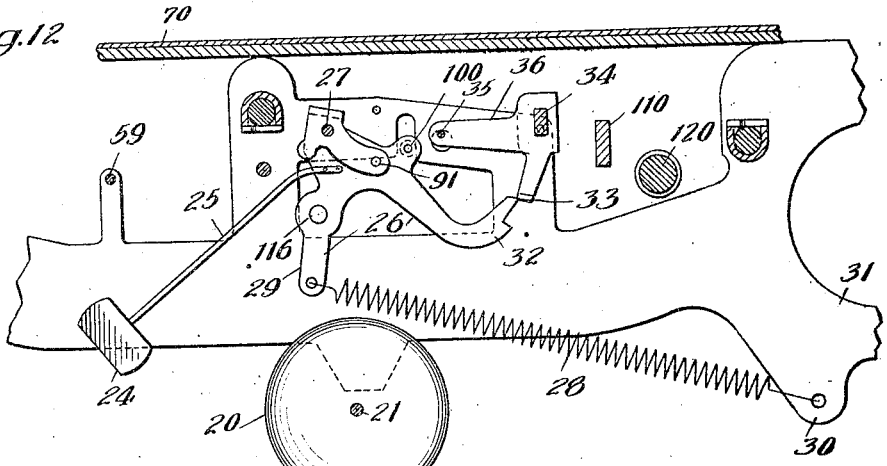

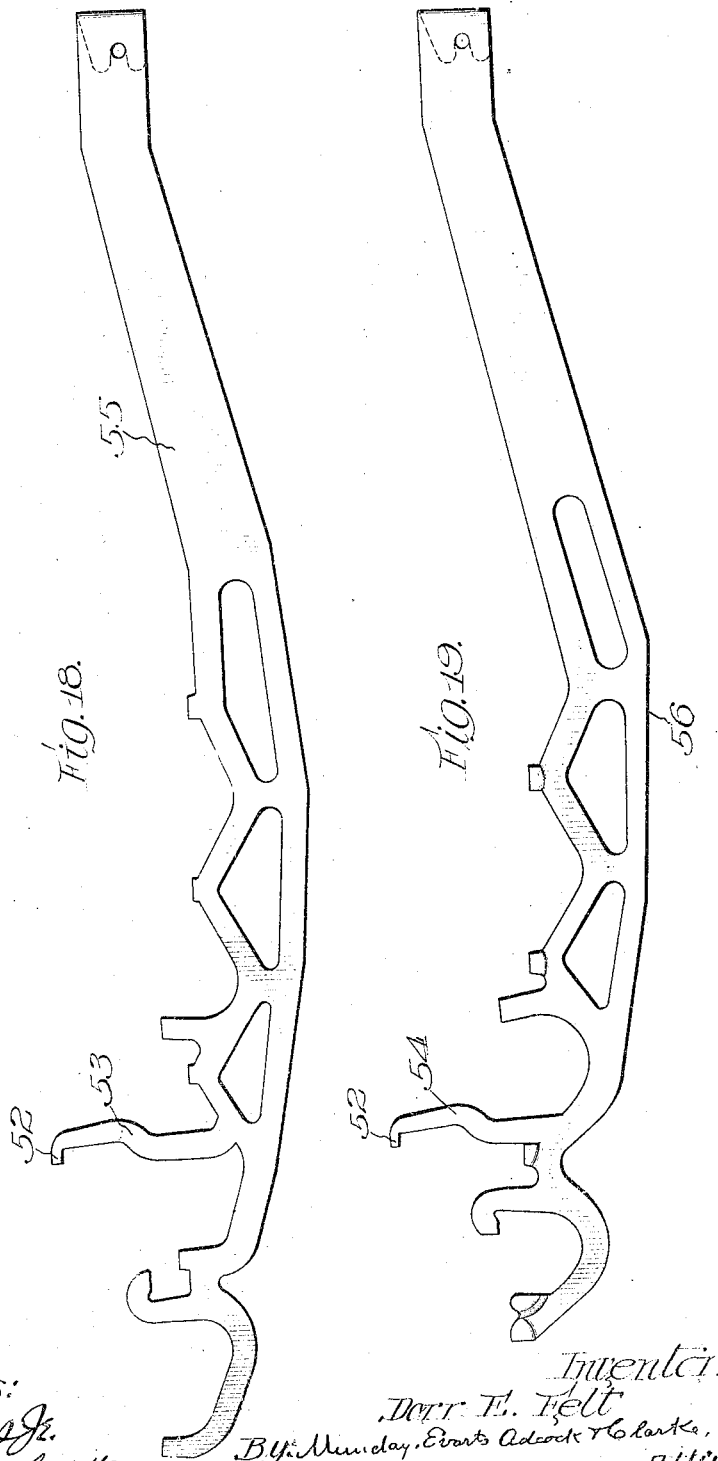

UNITED STATES PATENT OFFICE.

DORR E. FELT, OF CHICAGO, ILLINOIS.

CALCULATING-MACHINE.

992,950.  Specification of Letters Patent.  Patented May 23, 1911.

Application filed December 18, 1909. Serial No. 533,884.

*To all whom it may concern:*

Be it known that I, DORR E. FELT, a citizen of the United States, residing in Chicago, in the county of Cook and State of Illinois, have invented a new and useful Improvement in Calculating-Machines, of which the following is a specification.

My invention relates to calculating-machines provided with keyboard-mechanism having a plurality of keys whose manipulation determines the amounts added; and the particular embodiment of the invention here shown is an embodiment adapting said invention to a multiple-order key-driven duplexing calculating-machine such as the well known comptometer set forth in my prior United States Patents Nos. 762520, and 762521, of June 29, 1904, and 767107, of August 9, 1904, and in U. S. Patent No. 960528, issued June 7, 1910. The drawings particularly show the invention as embodied in a comptometer having the special construction set forth in my said patent.

The invention has for an object the providing of such a calculating-machine with a signal mechanism, as hereinafter claimed, coöperating with the keyboard-mechanism and adapted to signal the operator, independently of the apparent key-displacement, as soon as one of the keys is released after being incompletely manipulated; so that the operator may immediately correct such error. And the invention also has for an object the providing of such a calculating-machine with a locking-mechanism, as hereinafter claimed, coöperating with the keyboard-mechanism and adapted to lock other orders of the keys as soon as a key of one order is released after being incompletely manipulated; so that the operator may be prevented from proceeding with the computation without correcting such error.

The invention also has for an object the providing of such a calculating machine with a stop-mechanism, as hereinafter claimed, coöperating with the adding-mechanism and adapted to check the adding-action as soon as one of the keys is released after being incompletely manipulated; so that the operator may be enabled to correct such error by simply performing a key-manipulation that will effect the intended addition. And the invention also has for an object the providing of such a calculating-machine with an indicator-mechanism, as hereinafter claimed, coöperating with the above mentioned signal-mechanism and adapted to indicate the denominational order in which a key has been released after being incompletely manipulated; so that the operator may be aided to immediately ascertain the key that has been incompletely manipulated. And the invention also has for an object the providing of such a calculating-machine with a resetting-mechanism, as hereinafter claimed, coöperating with certain of the above mentioned accessory mechanisms and adapted to reset such mechanism to normal; so that the operator may restore all the accessory parts to normal immediately that he has corrected the incomplete manipulation of a key. And the invention also has for an object the providing of connections between such a resetting-mechanism and the canceling-mechanism, in such a calculating-machine, so that, as hereinafter claimed, the operation of the canceling-mechanism, in clearing the machine, may automatically reset to normal such accessory mechanisms as those above mentioned. And the invention has for further objects the coöperative action of all of the above mentioned mechanisms, and such other improvements in structure and function as may be found to obtain in the devices hereinafter described or claimed.

Figure 2:
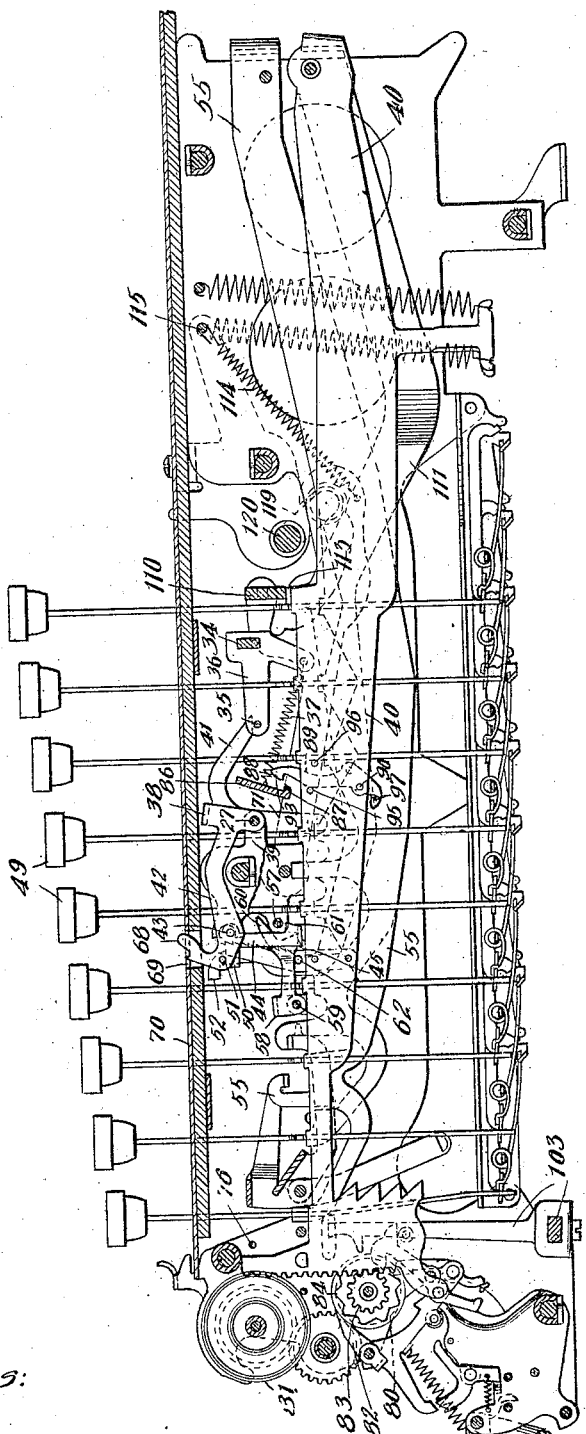
Figure 3:
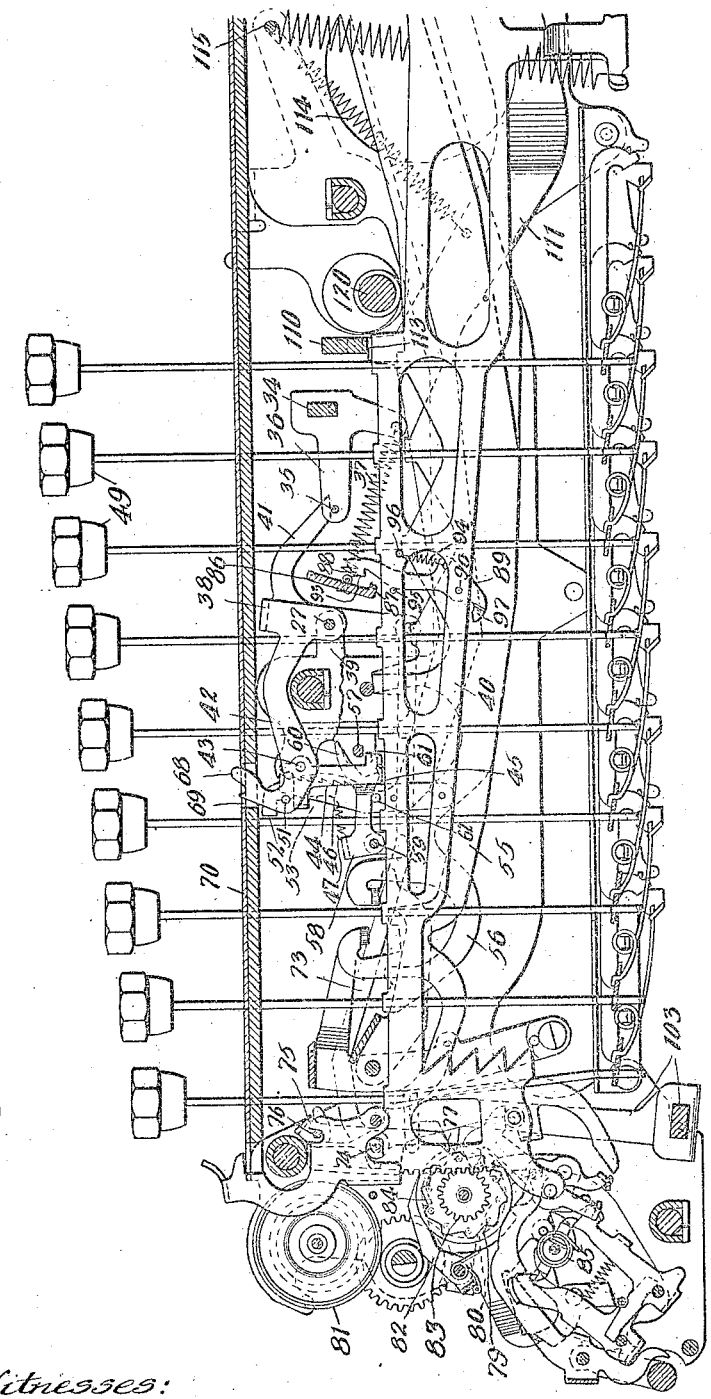
Figure 4:
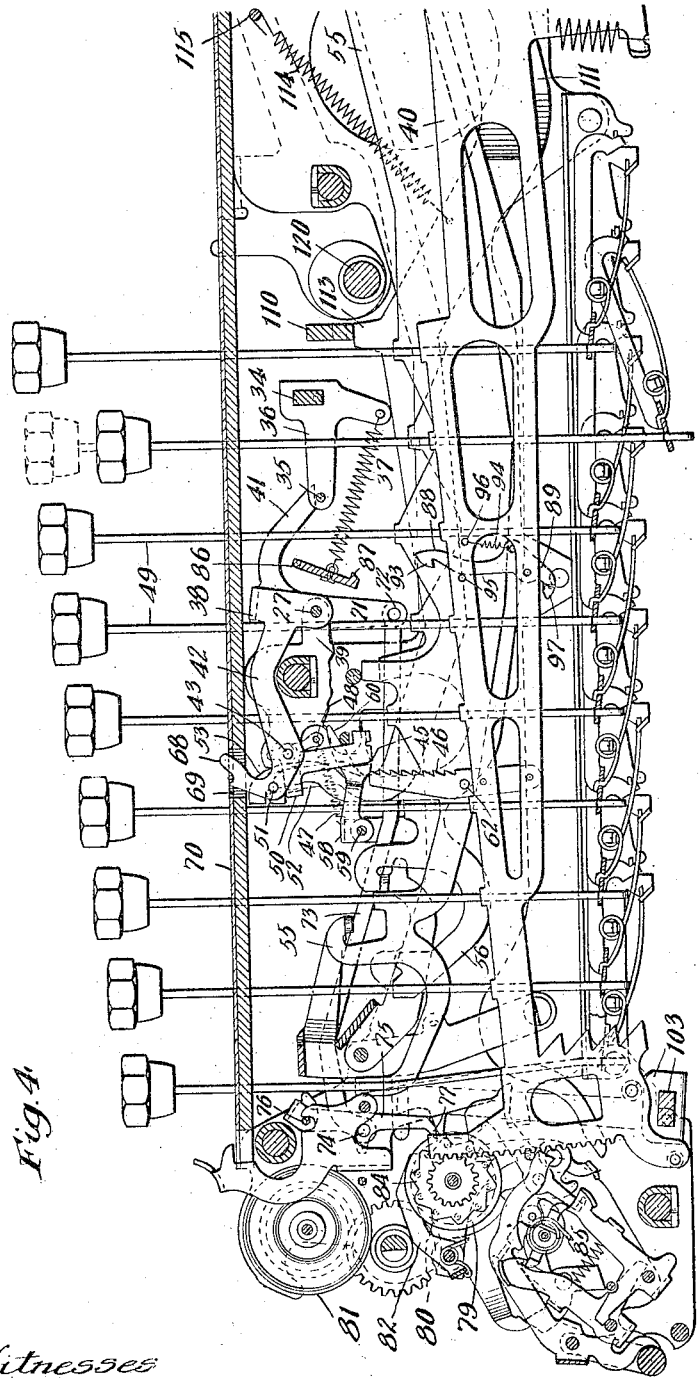
Figure 5:
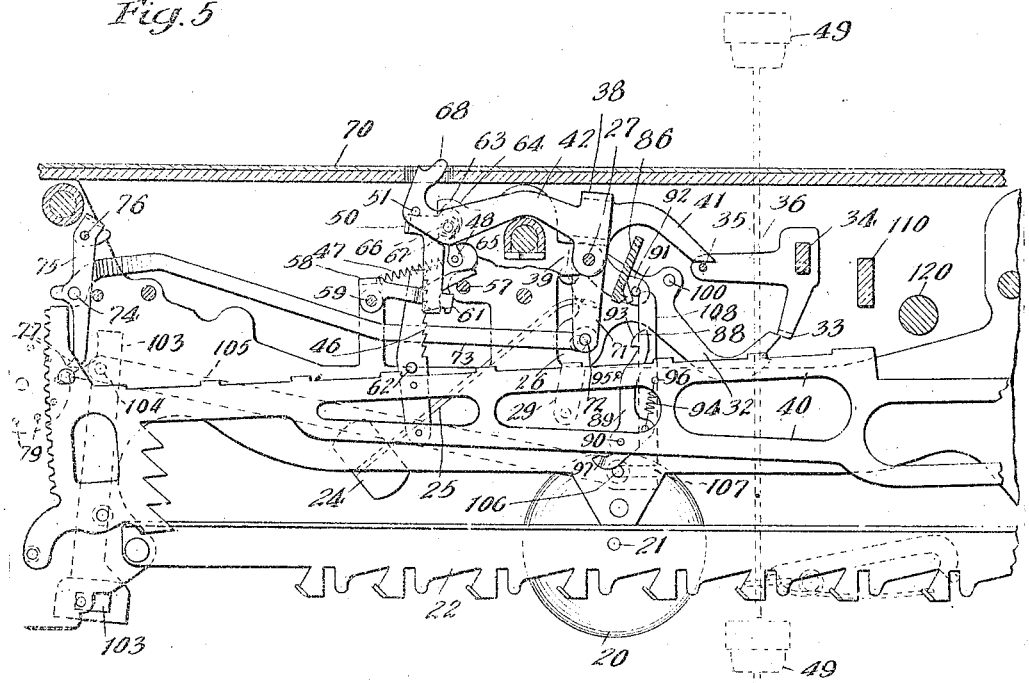
Figure 6:
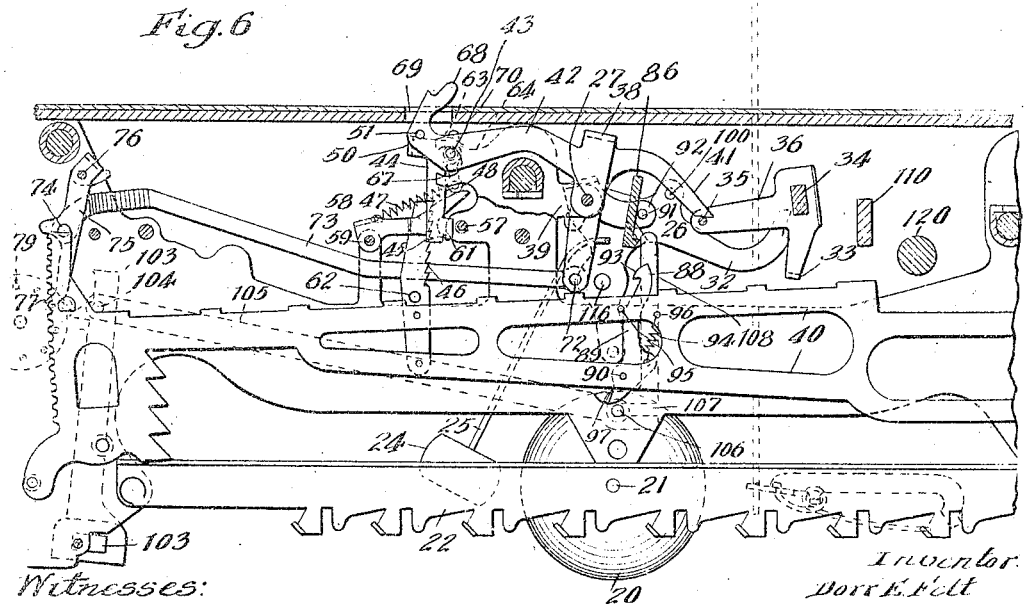
Figure 9:
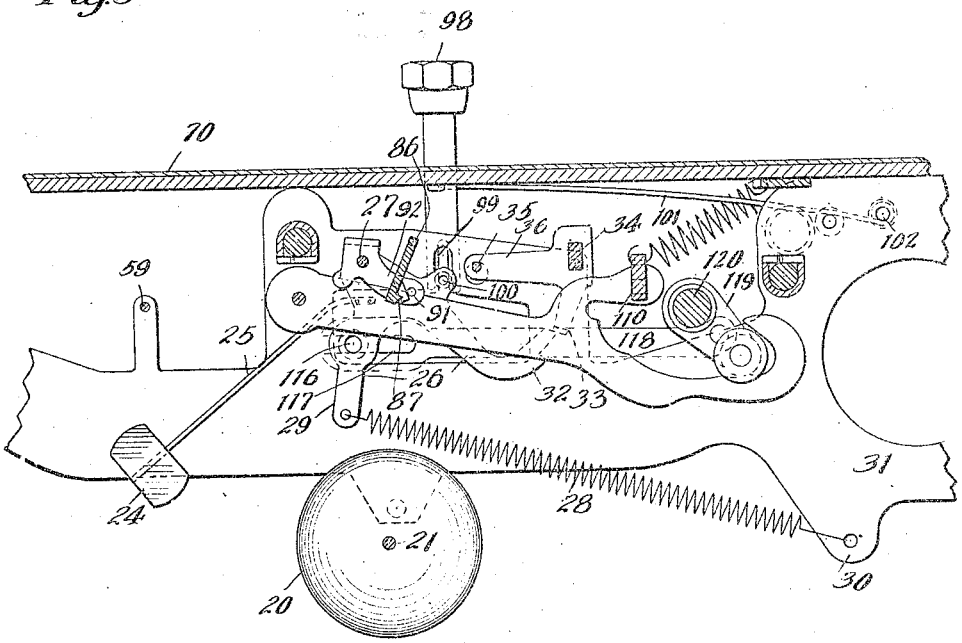
Figure 11:
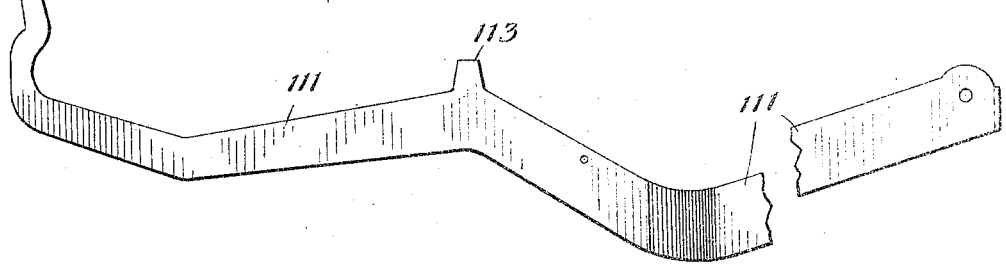

In the accompanying drawings, forming a part of this specification, and in which like reference numerals indicate like parts in all of the figures, Figure 1 shows a top plan view of the mechanism of my invention as embodied in the calculating-machine of the type set forth in my above mentioned patent, the said figure showing the machine with the case and key-plate removed and the key-stems transversely sectioned, and with several ordinal sections broken out of the middle of the machine longitudinally so as to permit the detailed mechanism to be shown on as large a scale as the sheet will accommodate; Fig. 2 is a longitudinal sectional view of the machine, taken on the line 2—2 of Fig. 1; Fig. 3 is a longitudinal sectional view of the forward portion of the machine, taken on the line 3—3 of Fig. 1, and on larger scale than Fig. 2, and showing the parts in normal position, as they are also shown in Fig. 2; Fig. 4 is a sectional view like Fig. 3 but showing the parts in the positions they assume when one of the keys of the keyboard is completely depressed; Fig. 5 is a detail of part of the mechanism appearing in Figs. 3 and 4, but showing the positions of parts of the signal and co-acting mechanisms at the instant when a key has been only partially depressed but not yet released, the key indicated being of the same digital rank as the one shown fully depressed in Fig. 4; Fig. 6 is the same as Fig. 5 except that the parts are shown in the position they take after the release, without completing the depression, of the key that Fig. 5 shows as partially depressed; Fig. 7 is a transverse sectional view, taken on the line 7—7 of Fig. 1; Fig. 8 is a transverse sectional view taken on the line 8—8 of Fig. 1; Fig. 9 is a fragmentary detail sectional view of the machine, taken on the line 9—9 of Fig. 1, to show parts of the resetting-mechanism co-operating with the above mentioned accessory mechanisms and operatively connected with certain members of the canceling-mechanism of the machine; Fig. 10 is an elevation of the right hand side of the machine with the side casing removed, to show the canceling-mechanism above referred to; Fig. 11 is a detail of one of the series of hook-levers that coact with the canceling-mechanism and release the trip-pawls, of the signaling trip-mechanism, during the canceling operation. Fig. 12 is a detail of the same bell-striking mechanism shown in Figs. 5 and 6, but with some of the parts omitted to give a clearer view of such details; Fig. 13 is a detail of the same trip-mechanism shown in Figs. 5 and 6, but with some of the parts omitted to give a clearer view of such details; Fig. 14 is a detail perspective of one of the trip-pawls 44; Fig. 15 is a detail perspective of the trigger-arm 33; Fig. 16 is a detail front view of one of the trip-levers 38; Fig. 17 is a detail perspective of the bell-lever 26; Fig. 18 is a side elevation of one of the stop-levers 55; Fig. 19 is a side elevation of one of the stop-levers 56.

20 is a signal-bell, rigidly connected at 21 to the frame member 22 of the machine, and arranged to be struck by the clapper 24 fixed on the free end of the spring-stem 25 whose other end is rigidly secured to the forward edge of the bell-lever 26 that is pivoted to oscillate on the end of rod pivot 27 and is impelled by the bell-spring 28 stretched between the downwardly depending arm 29, of said bell-lever, and the downwardly extending projection 30 of the frame-plate 31 (see Figs. 9, 5, 6, 8, 1). A rearwardly projecting arm 32 of said bell-lever is normally engaged by the free tip of the trigger-arm 33 that projects downward from the left hand end of the trigger rock-bar 34 that is mounted transversely on the machine and adapted to be rocked, to release the bell-lever, by the depression of the trigger-rod 35 that parallels said rock-bar and is supported in the free ends of the rock-arms 36 that project forward from and are secured to said rock-bar at intervals across the machine (see Figs. 1, 2, 3, 4, 5, 6, 9). This trigger-rod 35 is normally held raised by the spring 37, and is depressed by any one or more of the ordinal series of trip-levers 38, one for each ordinal place, that are mounted to oscillate on the rod 27 that is supported in the frame-plate ears 39 and positioned transversely above the series of column-actuator segment-levers 40. Each of these trip-levers 38 has a rearwardly projecting arm 41 whose free tip stands normally slightly above the aforesaid trigger-rod 35 and is adapted to rock the trigger-mechanism by being pressed down upon said trigger-rod; and each of said trip-levers has a forwardly projecting arm 42 whose forward end carries a lateral stud 43 upon which is swung the depending trip-pawl 44 whose free lower end has its forward edge 45 adapted to engage the saw-toothed ratchet 46 that is secured to and projects upward from the corresponding column-actuator segment-lever 40. A spring 47 attached to the downwardly projecting tip 48, of said trip-pawl, constantly presses said pawl toward engagement with the teeth of said ratchet. When the depression of a key, such as 49, depresses the corresponding column-actuator segment-lever, the said trip-pawl wipes over the inclined faces of the teeth of said ratchet member as the latter descends, dropping into these successive tooth spaces as they pass. And if the key is released, and the segment-lever thereby permitted to lift, while the trip-pawl so occupies any one of the tooth spaces of the said ratchet member, the abrupt horizontal edge of the corresponding ratchet tooth will engage the under side of the forward edge of the depending end of the said trip-pawl and bodily lift said pawl and, with it, the aforesaid trip-lever arm on which said trip-pawl is mounted; and such lifting of the forwardly projecting arm of said trip-lever will of course cause a corresponding depression of the rearwardly projecting arm of said trip-lever, and thereby cause the tripping of the bell-trip mechanism, with the result that the bell will be rung (Fig. 6). To prevent this from happening when the column-actuator has been properly depressed by the complete depression of the key manipulated, there are provided certain arrangements for swinging and holding the trip-pawl entirely out of contact with the aforesaid ratchet member during the return or upward stroke made by the column-actuator segment-lever when the operator releases a key that has been depressed to the complete extent required for the adding of the amount indexed on such key. To this end, the said trip-pawl has a short forwardly projected and laterally extending arm 50 that normally rests against the under side of the short stop-stud 51 fixed in the trip-lever somewhat forward of the stud on which the trip-pawl swings, and this arm 50 of the trip-pawl has hooked over it, and normally standing above it, the forwardly hooked upper ends 52 of the arms 53, 54 that project upwardly from the respective "odd" and "even" stop-levers 55, 56 that act to stop or limit the downward movement of the column-actuator segment-lever of corresponding order, said stop-levers being the stop members that are normally thrown into action just at the conclusion of the down stroke of any of the keys in the normal actuation of the machine of my aforesaid prior patents. The normal depression of one of these stop-levers 55 or 56, just at the conclusion of the down stroke of a key in the corresponding order, will cause the aforesaid hook 52 of the upwardly projecting arm, of such stop-lever, to abruptly descend upon and depress the aforesaid arm 50 of the trip-pawl, thereby swinging backward the depending lower end of said trip-pawl to a position entirely clear of the aforesaid ratchet member of the column-actuator segment-lever (see Fig. 4). This backward swinging of the trip-pawl is limited by the contact of its rear edge with the transverse rod 57; and just as the pawl reaches such limit of its rearward swing, the latch 58, which is pivoted on transverse rod 59, and whose free end has been resting on top of the transverse member of the lower end of the trip-pawl, drops in front of the forward edge of said member of the trip-pawl and so holds it, in its rearwardly swung position, while the ratchet member of the segment-lever is making the ensuing up-stroke. This latch 58 has its free end constantly pressed downward by the tension of the same spring, 47, that tends to draw the trip-pawl forward, the said spring being stretched between the projections that are respectively integral with the said trip-pawl and latch; and said latch is prevented from dropping too far downward, by a rearwardly projecting tip 60 that engages the same transverse rod that limits the backward swing of the trip-pawl; and the same rod also prevents the trip-pawl from rising, while the said trip-pawl is in the backwardly swung position, since a rearward projection 61 from the lower end of said trip-pawl is at that time engaged under the said rod (see Fig. 4).

Just at the conclusion of the up-stroke of the column-actuator segment-lever, after the proper and complete depression of a key has caused the trip-pawl to be swung back and engaged by the latch in the manner just described, the latch is struck and lifted by a projection 62, carried by the said segment-lever, and the trip-pawl is thus released from its engagement with the said latch and so permitted to drop back into the normal position shown in Fig. 3. During such complete up-stroke of the column-actuator, the aforesaid latch is required to hold the trip-pawl back, out of engagement with the ratchet member, because the stop-lever 55 or 56, whichever happens to have been actuated by the particular key that has been fully depressed, completely rises at the very beginning of the up-stroke of such key, and such rise of said stop-lever of course lifts its hook end 52 entirely free of the transverse arm 50 of the trip-pawl, restoring the said stop-lever to its normal raised position (Fig. 3). When the completion of the up-stroke of the column-actuator lifts the latch 58 and permits the trip-pawl to spring forward, under the tension of its spring 47, the said trip-pawl and the trip-lever arm that bears it are prevented from rising, both because of the downward pull of the said spring 47 and because the extreme tip of the trip-pawl's rearward projection 61 remains slightly engaged under the transverse rod 57 (Fig. 3), and the trip-pawl never moves forward entirely clear of said transverse rod except when a tooth of the ratchet member of the column-actuator is presented in front of the engaging edge of the lower end of said trip-pawl (Figs. 5 and 6). Thus the trip-pawl and the trip-lever arm that bears it are held in their depressed position, and the trip-lever prevented from tripping the bell-lever mechanism, when the machine is at normal (Figs. 2, 3). But when the trip-pawl and its trip-lever are lifted, in the manner before described, when a key has been released after being only partially depressed, the rise of said trip-lever arm, bearing the said trip-pawl, is limited by the upper lip 63 of the recessed projection 64 of the frame-plate 65 adjacent to said trip-lever, said lip 63 being struck by the stud-collar 66 on the base of the stud on which the trip-pawl is swung, said stud being, as before stated, a lateral projection from the trip-lever, and said collar being interposed between said trip-lever and the said trip-pawl borne on said trip-lever stud. During any up and down movement of the said trip-lever and its said stud, bearing the trip-pawl, the said collar travels in the aforesaid recess of the frame-plate projection 64, and any extreme downward movement is limited by the lower lip 67 that forms the under side of said recess in the frame-plate projection 64. The trip-lever arm bearing the trip-pawl never rises high enough to permit the trip-pawl to rise above the transverse rod 57.

When the trip-lever arm, bearing the trip-pawl, is thrown upward, by reason of the failure of the operator to completely depress the key manipulated, an upwardly projecting tongue 68, at the forward end of said trip-lever arm, is thrust upward through the slot 69 in the key-plate 70; and this tongue, thus thrust out above the key-plate, serves to indicate visually the particular denominational order in which the operator has failed to properly depress a key. And from such indication of the denominational order concerned, the operator is immediately able to determine the particular key, in that order, because he has only to notice the digit that appears in the same denominational place of the written item that he was intending to add when he failed to press the key all the way down. For instance, if he had intended to add the item "6752," and the indicator tongue is thrust above the key-plate in the hundreds denominational order or row of keys, he immediately knows that it was the "7" key, in the hundreds order, that he failed to completely depress. This indicator-mechanism thus enables him to proceed immediately to correct the error, the signal-mechanism having signaled him, by the ringing of the bell, as soon as the error was committed.

The simplest and most immediate manner of correcting the error of having failed to properly depress a key, would be to complete the depression of such key, if this may be done without falsifying the computation that is in progress. But to permit such a manner of correcting such error, it is necessary that a merely partial depression of a key shall not advance the reading of the numeral-wheel in the denominational order in which the key so manipulated is located. To this end there is provided, in the particular machine shown in the accompanying drawings, an accessory stop-mechanism, coöperating with the adding-mechanism and with the above-described signal-mechanism. Each trip-lever 38 has, below its axis of oscillation 27, a downwardly projecting arm 71 pivotally connected, at its lower extremity 72, with a forwardly extending link 73 whose forward end is pivotally connected, at 74, to the middle part of a swinging stop-detent 75 whose upper end is pivotally mounted on the transverse rod 76 and whose depending lower end terminates in a forwardly projecting detent-tip 77 that is arranged to engage the lantern ratchet 79 of the driving-gear 80 for the numeral-wheel 81 of the corresponding order, such engagement of said detent with said lantern ratchet taking place whenever the detent is swung forward, and operating to stop any further advance of the said numeral-wheel of that order (Figs. 5, 6, 3, 4). Such forward swinging of the detent, thus preventing the numeral-wheel movement, results from the forward swinging of the said link 73 when the said depending arm 71, of the trip-lever, is swung forward by the upward throw of the trip-lever arm that bears the trip-pawl, when the signal-mechanism is tripped in the manner above described. And the said detent movement is so timed that the numeral-wheel lantern-ratchet shall be stopped and held before the up-stroke of the corresponding column-actuator segment-lever 40 has advanced the said lantern ratchet far enough to permit the back-stop 82 to drop in behind the next following spoke of said lantern ratchet, and also before such segment-lever shall have turned its pinion 83 far enough forward to advance the internal-ratchet 84 a full tooth space,—so that the numeral-wheel 81 shall not have been advanced a full numeral space and cannot make a complete one-space movement until a subsequent complete column-actuator movement is effected by the complete manipulation of the same or a higher key in that order, such subsequent complete key-manipulation acting initially, as above described, to release the trip-mechanism and the stop-detent 75 and so permit the numeral-wheel lantern-ratchet to spring back, under the tension of the carrying-spring 85, from its partial one-space displacement to its original position, ready to receive the normal adding-throw. So, as a result of the action of the just described stop-mechanism, if the operator has failed to completely depress any key in a given order and then afterward completely manipulates the same or a higher key in that order, the final reading on the numeral-wheel of that order will be the same as if he had in the first instance struck the key that he finally manipulated, and the erroneous partial depression of one of the keys will have left no effect whatever on the final reading on that numeral-wheel. Thus, when the signal-bell signals the operator that he has failed to completely depress a key, he corrects such failure by properly depressing the same key. And if by any chance he does not know the digital index of the key he fumbled, he is certain to correct any error the fumble has injected into the reading, if he strikes the "9" key (the key of longest stroke) in the order that the indicator-tongue 68 indicates, and afterward subtracts "9" and strikes the intended key in that same order. Such a subtraction of "9" is of course effected in the usual manner of subtracting "9" on a calculating-machine of this type,—by the ordinary rule for subtraction. In any instance where a plurality of misstrokes have been simultaneously made by simultaneous partial depression of keys in a plurality of orders, in attempting to perform the usual "duplexing" operation of the duplex comptometer, the correction of such multiple error would be effected by a mere expansion of the same rule, correcting each column in which a misstroke has been indicated by an indicator-tongue 68.

To further prevent the operator from failing to promptly correct a misstroke that has been signaled to him, as above described, it is provided that as soon as the misstroke occurs in any order, all of the keys in all of the other orders of the machine in which no misstroke has occurred will be locked from making any further movement whatever until after a key has been fully depressed in each order where a misstroke has occurred, and until after the signal mechanism has been reset to normal. This of course also means that misstrokes could not be made in a plurality of orders without intervening correction of each, unless the plurality of keys misstruck were simultaneously depressed. It is also provided that the same locking mechanism shall effect the locking of all the keys in the order where the misstroke occurred, but not until after the operator has corrected the misstroke by completely manipulating a key in that order. A rocking lock-plate 86 is suspended transversely of the machine above the column-actuators, its ends being journaled to rock in the side frame-plates of the machine, the said plate depending from the axis on which swings (Figs. 8, 5, 6, 2, 3, 4). The lower edge of said rocking lock-plate is provided with a rearwardly projecting flange 87 adapted to engage the detent points 88 of the series of lock-pawls 89 that are pivotally mounted on the series of column-actuator segment-levers 40, one of said lock-pawls being pivoted on the stud 90 on each of said segment-levers. The lock-plate is constantly pressed toward the said series of lock-pawls by the same spring, 37, that tends to hold the trigger device at normal. And when the signal-mechanism is at normal, the said lock-plate is held rocked forward clear of said locking-pawls, by the stud 91 projecting laterally inward from the arm 92 of the bell-lever 26 and engaging the offset left end of said lock-plate; and the rocking of said bell-lever, when the bell-mechanism is tripped, releases the said lock-plate and permits it to spring rearward into position to engage as aforesaid the locking-pawls on the segment-levers. Such engagement, however, can only take place when the segment-levers are at normal, as any depression of any segment-lever will have brought the detent-tip of its locking-pawl down below the plane of possible engagement with the flange on the lower edge of the said locking-plate. If the depression of any segment-lever 40 has been considerable, the top of its locking-pawl 89 will have been carried entirely below the path of the locking flange of the said locking-plate; but if the depression of any segment-lever 40 has been only very slight, and the locking-plate is then released by the tripping of the signal-mechanism, the free edge of the rearwardly projecting flange along the bottom of said locking-plate will strike against the forward edge 93 of the detent-tip of the said locking-pawl, and thereby press the said locking-pawl slightly backward without displacing the locking-plate from operative engagement with the locking-pawls on any of the other segment-levers,— such backward pressing of any one or more of the locking-pawls, by the locking-plate, being effected by the pivotal mounting of said pawls and the fact that the spring impelling the locking plate to its operative rearward position has a tension greater than the sum of the tensions of the springs 94 that respectively press the detent-tips of the said locking-pawls forward. And by reason of the same conditions, if the depression of a column-actuator has carried its locking-pawl entirely below the said locking-plate, and the said locking plate is tripped into engagement with the locking-pawls on other column-actuators, the subsequent rise of the depressed column-actuator to normal will not displace the locking-plate from its said engagement, but the locking-pawl on the rising column-actuator will simply spring backward as the forward edge of the detent-tip of said pawl rides over the flange edge of the locking plate (Fig. 6). The spring 94 of each locking-pawl normally presses such pawl forward against the stop-stud 95 laterally projecting from the segment-lever 40 on which the pawl is pivoted, the said spring having its fixed end secured in the hole 96 in the same segment-lever just behind the pawl. And the rearward rocking of said pawl is limited by the bent tip 97 projecting from its lower end and curved under the lower edge of the segment-lever so as to engage said edge when the pawl is rocked backward. The locking of any segment-lever 40, by the engagement of its locking-pawl with the locking-plate, of course prevents the depression of any of the keys in the column of keys that normally operate said segment-lever.

The trip-mechanism in any column is reset to normal, as above described, by the complete depression and release of a key in that column. But such resetting of the trip-mechanism does not reset to normal either the bell-lever 26 or locking-plate 86. To reset the bell-lever 26 to normal there is provided an accessory key 98, at the lefthand side of the machine, the said key having the base of its key-stem vertically slotted, at 99, and the said slot engaging a stud 100 that is laterally fixed in the bell-lever. (Figs. 8 and 9). The said accessory or resetting key 98 is normally held raised by the spring 101 whose fixed end is secured to the stud 102 on the side frame-plate of the machine and whose free end engages the key-stem of said key just below the key-plate of the machine. When the bell-lever is at normal the stud 100 is positioned in the lower free end of the key-stem slot 99, but when the bell-lever has been tripped the said stud is thrown up toward the apex of said slot and the depression of the said key will then rock the bell-lever downward into the normal position where the free tip of the rearwardly projecting arm 32 of said bell-lever engages the free tip of the trigger-arm 33, such engagement holding the bell-device set ready for another tripping. Such rocking of the said bell-lever 26 back to normal also swings forward the stud 91 carried by the arm 92 of said bell-lever, and this forward movement of said stud 91 presses the locking-plate 86 forward clear of all the locking-pawls 89 of the segment-levers 40. Thus the depression of the resetting key 98 resets to normal both the bell-device and the locking-device, provided the trigger-arm 33 has previously been returned to normal by the resetting of any trip-mechanism that had been tripped by the incomplete manipulation of any key, such resetting of the trip-mechanism being effected by properly striking the proper key in each column where a key was misstruck.

It will now be evident that if the operator incompletely manipulates any key in any column or columns, the bell of the signal-mechanism will immediately ring and simultaneously all of the other ordinal columns of keys will be locked. And the proper striking of the key in each column then requiring correction will lock that column also, until the signal-bell is reset. And the signal-bell can not be reset until a proper key-stroke has reset the trip-mechanism in each column where a fumble has occurred. Incidentally it may be here remarked that a key is rarely fumbled, and incompletely depressed, by any except a wholly inexperienced operator, as it is found in practice that after a few days' use of a key-operated calculating-machine the operator always strikes the keys down their full stroke; so in such a calculating-machine the main utility of the above described mechanism is the discipline it affords an inexperienced operator, and an operator will rarely have occasion to use it at all after he has had a few days' practice in making computations on such a calculating-machine.

In order to provide that the normal actuation of the canceling-mechanism of the calculating-machine shall reset to normal all of the mechanism in the machine, all of the above described accessory mechanisms are arranged to be reset by, and incidentally to, the normal actuation of the canceling-mechanism of the machine. Such arrangement also makes it possible for the operator to remedy a fumble, of any key or keys, by simply operating the canceling-handle of the machine, and this will frequently be the most expeditious method when the fumble has been made before the computation in progress has proceeded too far. Where the computation has proceeded at considerable length before the fumble occurred, it might of course be undesirable to cancel the register and so the previously described method of correction of the fumble would be preferred.

The canceling-mechanism of the machine shown in the accompanying drawings has the same canceling-action as that described in my aforesaid U. S. Patent 960,528, issued June 7, 1910. The very beginning of the rearward throw of the canceling-handle causes the canceling-stops 103 to be thrown forward, as explained in my said patent. (Fig. 10). And this forward throw of said canceling-stops is utilized, in my present invention, to insure the unlocking, at the very beginning of the canceling-action, of any column-actuator segment-levers that may have been locked by the locking-plate 86. To this end the canceling-stop 103 at the left hand side of the machine has pivotally connected to it, at 104, the link member 105 that leads back to and is supported on the frame-plate stud 106 that is engaged in the horizontal slot 107 in the rear end of said link member (Figs. 5, 6); and the said link member has at its rear end an upwardly extending arm 108 whose apex is arranged to engage and press forward the locking-plate 86 when the said link member 105 is drawn forward by the aforesaid forward throw of the canceling-stop 103. This forward pressing of the locking-plate moves said plate clear of all engagement with the locking-pawls 89, if said plate happened to be in position to engage any of said pawls at the beginning of the operation of the canceling-handle 109. The further rearward movement of the canceling-handle causes, as explained in my said co-pending application, the depression of the transverse bar 110 to an extent sufficient to depress the column-actuator segment-levers 40 as far as each such segment-lever would be depressed by the complete depression of its own "1" key; and during a further part of the stroke of the canceling-handle, the said transverse bar 110 is completely lifted, permitting the series of column-actuator segment-levers to rise and thereby make a one-space advance of all of the numeral-wheels. Such actuation of the column-actuator segment-levers by the transverse bar 110 of the canceling-mechanism, is caused to reset all of the hereinabove described trip-mechanism to normal,—the movement of the column-actuator segment-lever, in any column where the trip-mechanism has been tripped, having the same effect as if the said column-actuator had been actuated by one of its own keys. But as no key movement accompanies this actuation of the column-actuator segment levers by the canceling-mechanism, none of the stop-levers 55 or 56, whose upwardly extended hooked arms 53 or 54 engage the arms 50 of the trip-pawls, are moved; and so there are provided a series of accessory hook-levers 111, swung on the same axis with the segment-levers 40 and having forward hook-arms 112 hooked over the arms 50 of the respective trip-pawls, the said accessory hook-levers 111 being arranged to co-act with the transverse bar 110 of the canceling-mechanism. (Figs. 2, 3, 4, 7, 8, 11). This co-action is effected by the contact of said transverse bar 110, as it descends, with the upward projection 113 on each of said accessory hook-levers 111; and to the end that these hook-levers may have their hook ends drawn down into engagement with the trip-pawls as soon as the transverse bar 110 of the canceling-mechanism begins to descend, it is arranged that the said upward projections 113 shall normally stand in immediate contact with the under edge of said bar 110, each of said levers 111 being constantly pressed upward, toward said bar 110, by a spring 114 whose upper end is looped over the transverse rod 115 of the machine. To the further end that the movement of the canceling-handle 109 shall reset the bell-lever 26 to normal, said bell-lever is provided with an additional lateral stud 116 engaged in a slot 117 in the forward end of a link 118 that leads back to and is pivotally connected on the crank-arm 119 on the left hand end of the crank-shaft 120 of the canceling-handle 109. When the bell-lever 26 and the canceling-handle 109 are both at normal, the said stud 116 will be positioned in the forward free end of the said slot 117; but when the bell-lever 26 has been tripped, to strike the bell, the said stud will be shifted to the rear or closed end of said slot 117 and then any subsequent forward throw of the crank-arm 119, by the rearward throw of canceling-handle 109, will cause said link 118 to carry said stud 116 forward, rocking the bell-lever 26 back into its normal position. And the said bell-lever will then have its arm 32 caught and held by the trigger-arm 33, because the trigger-mechanism will have been set back to normal by the resetting of the trip-mechanism during the just above described beginning of the operation of the canceling-mechanism of the machine. Whatever displacement any of the numeral-wheels may have suffered through any fumbling of any of the keys, the operation of the canceling-mechanism, by the ordinary back and forth stroke of the canceling-handle 109, will result in resetting all of the parts of the machine at normal, with all of the numeral-wheels at a reading of "0", at the conclusion of the canceling-action.

It will be noted that, in the machine here shown, although the signaling-mechanism signals the operator, independently of the apparent key-displacement, as soon as a key has been incompletely manipulated, the said key is left free to have its manipulation completed after such operation of the signaling-mechanism. This provision, in the particular embodiment of my invention here shown, precludes the possibility, objectionable in the particular form of machine here shown, of preventing the operator from immediately completing the manipulation of a key that he has failed to completely manipulate.

My invention is hereinabove set forth as embodied in one particular form of construction, but I do not limit it thereto or to less than all the possible forms in which the invention as hereinafter claimed may be embodied and distinguished from prior devices.

I claim:—

1. In a calculating-machine, in combination: adding-mechanism; a keyboard-mechanism having a plurality of keys whose manipulation determines the amounts added; and a signaling-mechanism coöperating with said keyboard-mechanism and adapted to signal the operator, independently of the apparent key-displacement, as soon as one of said keys is released after being incompletely manipulated; substantially as specified.

2. In a calculating-machine, in combination: adding-mechanism; a keyboard-mechanism having a plurality of keys whose manipulation determines the amounts added; and a locking-mechanism coöperating with said keyboard-mechanism and adapted to lock only others of said keys as soon as one of the keys is released after being incompletely manipulated, said key being free and returned to normal; substantially as specified.

3. In a calculating-machine, in combination: adding-mechanism; a keyboard-mechanism having a plurality of keys whose manipulation determines the amounts added; and a stop-mechanism coöperating with said keyboard-mechanism and adding-mechanism and adapted to check the adding-action as soon as one of said keys is released after being incompletely manipulated; substantially as specified.

4. In a calculating-machine, in combination: adding-mechanism, a keyboard-mechanism having a plurality of keys whose manipulation provides the power for driving said adding-mechanism; and a signaling-mechanism coöperating with said keyboard-mechanism and adapted to signal the operator, independently of the apparent key-displacement, as soon as one of said keys is released after being incompletely manipulated; substantially as specified.

5. In a calculating-machine, in combination: adding-mechanism; a keyboard-mechanism having a plurality of keys whose manipulation provides the power for driving said adding-mechanism; and a locking-mechanism coöperating with said keyboard-mechanism and adapted to lock only others of said keys as soon as one of the keys is released after being incompletely manipulated, said key being free and returned to normal; substantially as specified.

6. In a calculating-machine, in combination: adding-mechanism; a keyboard-mechanism having a plurality of keys whose manipulation provides the power for driving said adding-mechanism; and a stop-mechanism coöperating with said keyboard-mechanism and adding-mechanism and adapted to check the adding-action as soon as one of said keys is released after being incompletely manipulated; substantially as specified.

7. In a calculating-machine, in combination: adding-mechanism; a multiple-order keyboard-mechanism having a multiplicity of denominational orders of keys whose manipulation determines the amounts added; and a signaling-mechanism coöperating with said keyboard-mechanism and adapted to signal the operator, independently of the apparent key-displacement, as soon as one of said keys is released after being incompletely manipulated; substantially as specified.

8. In a calculating-machine, in combination: adding-mechanism; a multiple-order keyboard-mechanism having a multiplicity of denominational order of keys whose manipulation determines the amounts added; and a locking-mechanism coöperating with said keyboard-mechanism and adapted to lock other orders of said keys as soon as a key of one order is released after being incompletely manipulated; substantially as specified.

9. In a calculating-machine, in combination: adding-mechanism; a multiple-order keyboard-mechanism having a multiplicity of denominational orders of keys whose manipulation determines the amounts added; and a stop-mechanism coöperating with said keyboard-mechanism and adding-mechanism and adapted to check the adding-action as soon as one of said keys is released after being incompletely manipulated; substantially as specified.

10. In a calculating-machine, in combination: adding-mechanism; a multiple-order keyboard-mechanism having a multiplicity of denominational orders of keys whose manipulation provides the power for driving said adding-mechanism; and a signaling-mechanism coöperating with said keyboard-mechanism and adapted to signal the operator, independently of the apparent key-displacement, as soon as one of said keys is released after being incompletely manipulated; substantially as specified.

11. In a calculating-machine, in combination: adding-mechanism; a multiple-order keyboard-mechanism having a multiplicity of denominational orders of keys whose manipulation provides the power for driving said adding-mechanism; and a locking-mechanism coöperating with said keyboard-mechanism and adapted to lock other orders of said keys as soon as a key of one order is released after being incompletely manipulated; substantially as specified.

12. In a calculating-machine, in combination: adding-mechanism; a multiple-order keyboard-mechanism having a multiplicity of denominational orders of keys whose manipulation provides the power for driving said adding-mechanism; and a stop-mechanism coöperating with said keyboard-mechanism and adding-mechanism and adapted to check the adding-action as soon as one of said keys is released after being incompletely manipulated; substantially as specified.

13. In a calculating-machine, in combination: adding-mechanism; a keyboard-mechanism having a plurality of keys whose manipulation determines the amounts added; a signaling-mechanism coöperating with said keyboard-mechanism and adapted to signal the operator, independently of the apparent key-displacement, as soon as one of said keys is released after being incompletely manipulated; and a locking-mechanism actuated by said signaling-mechanism; substantially as specified.

14. In a calculating-machine, in combination: adding-mechanism; a keyboard-mechanism having a plurality of keys whose manipulation determines the amounts added; a signaling-mechanism coöperating with said keyboard-mechanism and adapted to signal the operator, independently of the apparent key-displacement, as soon as one of said keys is released after being incompletely manipulated; and a stop-mechanism actuated by said signaling-mechanism; substantially as specified.

15. In a calculating-machine, in combination: adding-mechanism; a keyboard-mechanism having a plurality of keys whose manipulation determines the amounts added; a signaling-mechanism coöperating with said keyboard-mechanism and adapted to signal the operator, independently of the apparent key-displacement, as soon as one of said keys is released after being incompletely manipulated; a locking-mechanism actuated by said signaling-mechanism; and a stop-mechanism actuated by said signaling-mechanism; substantially as specified.

16. In a calculating-machine, in combination: adding-mechanism; a keyboard-mechanism having a plurality of keys whose manipulation determines the amounts added; and a bell-mechanism coöperating with said keyboard-mechanism and adapted to signal the operator as soon as one of said keys is released after being incompletely manipulated; substantially as specified.

17. In a calculating-machine, in combination: adding-mechanism; a keyboard-mechanism having a plurality of keys whose manipulation provides the power for driving said adding-mechanism; and a bell-mechanism coöperating with said keyboard-mechanism and adapted to signal the operator as soon as one of said keys is released after being incompletely manipulated; substantially as specified.

18. In a calculating-machine, in combination: adding-mechanism; a multiple-order keyboard-mechanism having a multiplicity of denominational orders of keys whose manipulation determines the amounts added; and a bell-mechanism coöperating with said keyboard-mechanism and adapted to signal the operator as soon as one of said keys is released after being incompletely manipulated; substantially as specified.

19. In a calculating-machine, in combination: adding-mechanism; a multiple-order keyboard-mechanism having a multiplicity of denominational orders of keys whose manipulation provides the power for driving said adding-mechanism; and a bell-mechanism coöperating with said keyboard-mechanism and adapted to signal the operator as soon as one of said keys is released after being incompletely manipulated; substantially as specified.

20. In a calculating-machine, in combination: adding-mechanism; a multiple-order keyboard-mechanism having a plurality of keys whose manipulation determines the amounts added; a signaling-mechanism coöperating with said keyboard-mechanism and adapted to signal the operator, independently of the apparent key-displacement, as soon as one of said keys is released after being incompletely manipulated; and an indicator-mechanism coöperating with said signaling-mechanism and adapted to indicate the order in which said key has been so manipulated; substantially as specified.

21. In a calculating-machine, in combination: adding-mechanism; a multiple-order keyboard mechanism having a plurality of keys whose manipulation determines the amounts added; a signaling-mechanism coöperating with said keyboard-mechanism and adapted to signal the operator, independently of the apparent key-displacement, as soon as one of said keys is released after being incompletely manipulated; and an indicator-mechanism, having a visible indicator, coöperating with said signaling-mechanism and adapted to indicate visually the order in which said key has been so manipulated; substantially as specified.

22. In a calculating-machine, in combination: adding-mechanism; a keyboard-mechanism having a plurality of keys whose manipulation determines the amounts added; and a signaling-mechanism coöperating with said keyboard-mechanism and adapted to signal the operator, independently of the apparent key-displacement, as soon as one of said keys is released after being incompletely manipulated, said signaling-mechanism being provided with a resetting-device adapted to reset its signal to normal; substantially as specified.

23. In a calculating-machine, in combination: adding-mechanism; a keyboard-mechanism having a plurality of keys whose manipulation determines the amounts added; a signaling-mechanism coöperating with said keyboard-mechanism and adapted to signal the operator, independently of the apparent key-displacement, as soon as one of said keys is released after being incompletely manipulated, said signaling-mechanism being provided with a resetting-device adapted to reset its signal to normal; and a locking-mechanism actuated by said signaling-mechanism and provided with a resetting-device adapted to reset the locking member to normal; substantially as specified.

24. In a calculating-machine, in combination: adding-mechanism; canceling-mechanism; a keyboard-mechanism having a plurality of keys whose manipulation determines the amounts added; and a signaling-mechanism coöperating with said keyboard-mechanism and adapted to signal the operator, independently of the apparent key-displacement, as soon as one of the said keys is released after being incompletely manipulated, said signaling-mechanism being provided with connections leading to said canceling-mechanism and adapted to permit said signaling-mechanism to be reset to normal by the actuation of the said canceling-mechanism; substantially as specified.

25. In a calculating-machine, in combination: adding-mechanism; canceling mechanism; a keyboard-mechanism having a plurality of keys whose manipulation determines the amounts added; and a locking-mechanism coöperating with said keyboard-mechanism and adapted to lock other orders of said keys as soon as a key of one order is released after being incompletely manipulated, said locking-mechanism being provided with connections leading to said canceling-mechanism and adapted to permit said locking-mechanism to be reset to normal by the actuation of the said canceling-mechanism; substantially as specified.

26. In a calculating-machine, in combination: adding-mechanism; canceling mechanism; a keyboard-mechanism having a plurality of keys whose manipulation determines the amounts added; and a stop-mechanism coöperating with said keyboard-mechanism and adding-mechanism and adapted to check the adding-action as soon as one of said keys is released after being incompletely manipulated, said stop-mechanism also coöperating with said canceling-mechanism and being adapted to be reset to normal by the actuation of the said canceling-mechanism; substantially as specified.

27. In a calculating-machine, in combination: adding-mechanism; canceling-mechanism; a keyboard-mechanism having a plurality of keys whose manipulation determines the amounts added; a signaling-mechanism coöperating with said keyboard-mechanism and adapted to signal the operator, independently of the apparent key-displacement, as soon as one of said keys is released after being incompletely manipulated; a locking-mechanism actuated by said signaling-mechanism; and a stop-mechanism actuated by said signaling-mechanism; said signaling-mechanism and locking-mechanism and stop-mechanism being provided with connections leading to said canceling-mechanism and adapted to permit all of the three aforesaid mechanisms to be reset to normal by the actuation of the said canceling-mechanism; substantially as specified.

28. In a calculating-machine, in combination: adding-mechanism having carrying-devices adapted to permit said adding-mechanism to receive prime actuations in a plurality of orders simultaneously; a multiple-order keyboard-mechanism having a multiplicity of denominational orders of keys whose manipulation provides the power for driving said adding-mechanism; and a signaling-mechanism coöperating with said keyboard-mechanism and adapted to signal the operator, independently of the apparent key-displacement, as soon as one of said keys is released after being incompletely manipulated; substantially as specified.

29. In a calculating-machine, in combination: adding-mechanism having carrying-devices adapted to permit said adding-mechanism to receive prime actuations in a plurality of orders simultaneously; a multiple-order keyboard-mechanism having a multiplicity of denominational orders of keys whose manipulation provides the power for driving said adding-mechanism; and a bell-mechanism coöperating with said keyboard-mechanism and adapted to signal the operator as soon as one of said keys is released after being incompletely manipulated; substantially as specified.

30. In a calculating-machine, in combination: adding-mechanism having carrying-devices adapted to permit said adding-mechanism to receive prime actuations in a plurality of orders simultaneously; a multiple-order keyboard-mechanism having a multiplicity of denominational orders of keys whose manipulation provides the power for driving said adding-mechanism; and a locking-mechanism coöperating with said keyboard-mechanism and adapted to lock other orders of said keys as soon as a key of one order is released after being incompletely manipulated; substantially as specified.

31. In a calculating-machine, in combination: adding-mechanism having carrying-devices adapted to permit said adding-mechanism to receive prime actuations in a plurality of orders simultaneously; a multiple-order keyboard-mechanism having a multiplicity of denominational orders of keys whose manipulation provides the power for driving said adding-mechanism; and a stop-mechanism coöperating with said keyboard-mechanism and adding-mechanism and adapted to check the adding-action as soon as one of said keys is released after being incompletely manipulated; substantially as specified.

32. In a calculating-machine, in combination: adding-mechanism having carrying-devices adapted to permit said adding-mechanism to receive prime actuations in a plurality of orders simultaneously; a multiple-order keyboard-mechanism having a multiplicity of denominational orders of keys whose manipulation provides the power for driving said adding-mechanism; a signaling-mechanism coöperating with said keyboard-mechanism and adapted to signal the operator, independently of the apparent key-displacement, as soon as one of said keys is released after being incompletely manipulated; and a locking-mechanism actuated by said signaling-mechanism; substantially as specified.

33. In a calculating-machine, in combination: adding-mechanism having carrying-devices adapted to permit said adding-mechanism to receive prime actuations in a plurality of orders simultaneously; a multiple-order keyboard-mechanism having a multiplicity of denominational orders of keys whose manipulation provides the power for driving said adding-mechanism; a signaling-mechanism coöperating with said keyboard-mechanism and adapted to signal the operator, independently of the apparent key-displacement, as soon as one of said keys is released after being incompletely manipulated; and a stop-mechanism actuated by said signaling-mechanism; substantially as specified.

34. In a calculating-machine, in combination: adding-mechanism having carrying-devices adapted to permit said adding-mechanism to receive prime actuations in a plurality of orders simultaneously; a multiple-order keyboard-mechanism having a multiplicity of denominational orders of keys whose manipulation provides the power for driving said adding-mechanism; a signaling-mechanism coöperating with said keyboard mechanism and adapted to signal the operator, independently of the apparent key-displacement, as soon as one of said keys is released after being incompletely manipulated; a locking-mechanism actuated by said signaling-mechanism; and a stop-mechanism actuated by said signaling-mechanism; substantially as specified.

35. In a calculating-machine, in combination: adding-mechanism having carrying-devices adapted to permit said adding-mechanism to receive prime actuations in a plurality of orders simultaneously; canceling-mechanism; a multiple-order keyboard-mechanism having a multiplicity of denominational orders of keys whose manipulation provides the power for driving said adding-mechanism; and a signaling-mechanism coöperating with said keyboard-mechanism and adapted to signal the operator, independently of the apparent key-displacement, as soon as one of said keys is released after being incompletely manipulated, said signaling-mechanism being provided with connections leading to said canceling-mechanism and adapted to permit said signaling-mechanism to be reset to normal by the actuation of the said canceling-mechanism; substantially as specified.

36. In a calculating-machine, in combination: adding-mechanism having carrying-devices adapted to permit said adding-mechanism to receive prime actuations in a plurality of orders simultaneously; canceling-mechanism; a multiple-order keyboard-mechanism having a multiplicity of denominational orders of keys whose manipulation provides the power for driving said adding-mechanism; and a locking-mechanism coöperating with said keyboard-mechanism and adapted to lock other orders of said keys as soon as a key of one order is released after being incompletely manipulated, said locking-mechanism being provided with connections leading to said canceling-mechanism and adapted to permit said locking-mechanism to be reset to normal by the actuation of the said canceling-mechanism; substantially as specified.

37. In a calculating-machine, in combination: adding-mechanism having carrying-devices adapted to permit said adding-mechanism to receive prime actuations in a plurality of orders simultaneously; canceling-mechanism; a multiple-order keyboard-mechanism having a multiplicity of denominational orders of keys whose manipulation provides the power for driving said adding-mechanism; and a stop-mechanism coöperating with said keyboard-mechanism and adding-mechanism and adapted to check the adding-action as soon as one of said keys is released after being incompletely manipulated, said stop-mechanism also coöperating with said canceling-mechanism and being adapted to be reset to normal by the actuation of said canceling-mechanism; substantially as specified.

38. In a calculating-machine, in combination: adding-mechanism having carrying-devices adapted to permit said adding-mechanism to receive prime actuations in a plurality of orders simultaneously; canceling-mechanism; a multiple-order keyboard-mechanism having a multiplicity of denominational orders of keys whose manipulation provides the power for driving said adding-mechanism; a signaling-mechanism coöperating with said keyboard-mechanism and adapted to signal the operator, independently of the apparent key-displacement, as soon as one of said keys is released after being incompletely manipulated, and stop-mechanism being provided with connections leading to said canceling-mechanism and adapted to permit all of the three aforesaid mechanisms to be reset to normal by the actuation of said canceling-mechanism; substantially as specified.

39. In a calculating-machine, in combination: adding-mechanism; a keyboard-mechanism having a plurality of keys whose manipulation determines the amounts added; and a signaling-mechanism coöperating with said keyboard-mechanism and adapted to signal the operator, independently of the apparent key-displacement, as soon as one of said keys is released after being incompletely manipulated, said signaling-mechanism having a spring-actuated signal-device provided with a trip-device that is held out of action when the keys are completely manipulated; substantially as specified.

40. In a calculating-machine, in combination: adding-mechanism; a multiple-order keyboard-mechanism having a multiplicity of denominational orders of keys whose manipulation determines the amounts added; and a locking-mechanism coöperating with said keyboard-mechanism and adapted to lock other orders of said keys as soon as a key of one order is released after being incompletely manipulated, said locking-mechanism having a locking-device provided with a trip-device that is held out of action when the keys are completely manipulated; substantially as specified.

41. In a calculating-machine, in combination: adding-mechanism; a keyboard-mechanism having a plurality of keys whose manipulation determines the amounts added; and a stop-mechanism coöperating with said keyboard-mechanism and adding-mechanism and adapted to check the adding-action as soon as one of said keys is released after being incompletely manipulated, said stop-mechanism having a stop-device provided with a trip-device that is held out of action when the keys are completely manipulated; substantially as specified.

42. In a calculating-machine, in combination: adding-mechanism; canceling-mechanism; a keyboard-mechanism having a plurality of keys whose manipulation determines the amounts added; and a signaling-mechanism coöperating with said keyboard-mechanism and adapted to signal the operator, independently of the apparent key-displacement, as soon as one of said keys is released after being incompletely manipulated, said signaling-mechanism being provided with a resetting-device adapted to reset the signal-device to normal; said resetting-device having connections leading to the canceling-mechanism and adapted to permit the canceling-mechanism to actuate it, and also having an independently operable key adapted to permit the resetting to be effected independently of the canceling-mechanism; substantially as specified.

43. A keyboard-operated machine having a plurality of keys whose manipulation is adapted to effect the normal actuation of the machine; said keyboard-mechanism being combined with a coöperating signaling-mechanism adapted to signal the operator, independently of the apparent key-displacement, as soon as a key is released after being incompletely manipulated; said key being left free to have its manipulation completed after such operation of said signaling-mechanism; substantially as specified.

In testimony whereof I hereunto set my hand before two subscribing witnesses.

DORR E. FELT.

Witnesses:
HENRY LOVE CLARKE,
PEARL ABRAMS.